(12) United States Patent
Otsubo et al.

(10) Patent No.: US 11,440,418 B2
(45) Date of Patent: Sep. 13, 2022

(54) CONTROL SYSTEM FOR ELECTRIC VEHICLE

(71) Applicant: TOYOTA JIDOSHA KABUSHIKI KAISHA, Toyota (JP)

(72) Inventors: Hideaki Otsubo, Aichi-gun (JP); Daijiro Kawasaki, Susono (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 320 days.

(21) Appl. No.: 16/794,337

(22) Filed: Feb. 19, 2020

(65) Prior Publication Data

US 2020/0269703 A1    Aug. 27, 2020

(30) Foreign Application Priority Data

Feb. 25, 2019 (JP) .............................. JP2019-031741

(51) Int. Cl.
*B60W 50/16* (2020.01)
*B60L 15/20* (2006.01)
*F16H 59/08* (2006.01)

(52) U.S. Cl.
CPC ......... *B60L 15/2009* (2013.01); *B60W 50/16* (2013.01); *F16H 59/08* (2013.01)

(58) Field of Classification Search
CPC .. B60L 15/2009; B60L 7/18; B60L 2240/423; B60W 50/16; F16H 59/08; Y02T 10/64; Y02T 10/72
See application file for complete search history.

(56) References Cited

U.S. PATENT DOCUMENTS

2013/0066509 A1    3/2013   Nakamura et al.

FOREIGN PATENT DOCUMENTS

| CN | 104553821 A | * | 4/2015 | ........... B60K 7/0007 |
|---|---|---|---|---|
| CN | 106218418 A | * | 12/2016 | ................ B60L 7/18 |
| JP | H1178839 A | * | 3/1999 | |
| JP | H11-113108 A | | 4/1999 | |
| JP | 2001-103618 A | | 4/2001 | |
| JP | 2005-130613 A | | 5/2005 | |
| JP | 2011-250648 A | | 12/2011 | |
| JP | 2017-055607 A | | 3/2017 | |

\* cited by examiner

*Primary Examiner* — Justin Holmes
(74) *Attorney, Agent, or Firm* — Oblon, McClelland, Maier & Neustadt, L.L.P.

(57) ABSTRACT

A control system for an electric vehicle configured to allow a driver to grasp the situation of the electric vehicle when launching the electric vehicle by operating a brake pedal, and to reduce electric consumption of a motor. A controller controls the motor to generate a signal torque when a brake pedal depressed to generate brake force is returned so as to allow the driver to sense a change in a behavior of the vehicle, and terminate generation of the signal torque by the motor before the brake force is reduced to zero.

6 Claims, 5 Drawing Sheets

CONTROL SYSTEM FOR ELECTRIC VEHICLE

CROSS REFERENCE TO RELATED APPLICATIONS

The present disclosure claims the benefit of Japanese Patent Application No. 2019-031741 filed on Feb. 25, 2019 with the Japanese Patent Office, the disclosure of which are incorporated herein by reference in its entirety.

BACKGROUND

Field of the Disclosure

Embodiments of the present disclosure relate to the art of a control system for an electric vehicle powered by a motor as a prime mover.

Discussion of the Related Art

JP-A-2001-103618 describes a controller of an electric vehicle powered by a motor. In order to launch the electric vehicle at an extremely low speed, the controller taught by JP-A-2001-103618 is configured to generate a quasi-creep torque which is approximately inversely proportional to a brake stroke, when a shift position is in a traveling range, an accelerator is not operated, and a vehicle speed is not higher than a prescribed value. According to the teachings of JP-A-2001-103618, such quasi-creep torque is changed in accordance with the brake stroke.

JP-A-2011-250648 describes a play-reducing control apparatus for an electrically driven vehicle. The electric vehicle described in JP-A-2011-250648 may also be propelled by a creep torque. In order to reduce an electric consumption of a motor, the control apparatus taught by JP-A-2011-250648 is configured to execute a creeping-cut such that the creep torque of the electric motor is brought to 0 when a predetermined creeping-cut permitting condition is satisfied. According to the teachings of JP-A-2011-250648, for example, the control apparatus executes the creeping-cut when a brake switch is turned on so that a vehicle speed is reduced lower than a predetermined level. The control apparatus taught by JP-A-2011-250648 is further configured to generate a play-reducing torque in a rotational direction of a selected shift position during execution of the creeping-cut in a drive range or a reverse range. In the electric vehicle described in JP-A-2011-250648, therefore, the play (looseness) in the motor transfer system is reduced during execution of the creeping-cut thereby preventing generation of rattling noise and vibration when launching or accelerating the electric vehicle after the creeping-cut.

In conventional vehicles having an engine and an automatic transmission, an output torque of the engine is delivered to drive wheels through a torque converter and the transmission. That is, in the conventional vehicles, a creep torque of very small magnitude is always generated by the torque converter as long as the engine is activated, and the conventional vehicles may be launched smoothly and propelled at a very low speed by the creep torque.

As described, the electric vehicles described in JP-A-2001-103618 and JP-A-2011-250648 may be launched or propelled at a low speed by the creep torque generated by the motor while consuming electricity. In order to reduce such electric consumption of the motor, the control apparatus taught by JP-A-2011-250648 executes the creeping-cut upon satisfaction of the predetermined control.

However, if the motor generates the creep torque when launching the conventional electric vehicle by releasing a brake pedal, a driver may be upset by such unexpected generation of the creep torque. When launching the conventional vehicle having the torque converter by returning the brake pedal, the driver may sense a change in the behavior of the vehicle, e.g., a change in vibration resulting from increasing a drive force by the creep torque. That is, the driver may grasp the situation of launching the vehicle based on a change in the behavior of the vehicle. By contrast, behavior of the conventional electric vehicle will not be changed even if the brake pedal is returned to launch the electric vehicle. Therefore, the driver may not grasp the situation of the vehicle based on a change in the behavior of the vehicle when launching the electric vehicle by releasing the brake pedal. Especially, if a driver driving the vehicle in which the creep torque is available on most occasions drives the electric vehicle, the driver may not grasp the situation accurately based on a change in the behavior of the vehicle. For example, the driver may not confidently recognize a current shift position based on a change in the behavior of the vehicle.

SUMMARY

Aspects of embodiments of the present disclosure have been conceived noting the foregoing technical problems, and it is therefore an object of the present disclosure to provide a control system for an electric vehicle configured to allow a driver to grasp the situation of the electric vehicle when launching the electric vehicle by operating a brake pedal, and to reduce electric consumption of a motor.

The control system according to the exemplary embodiment of the present disclosure is applied to an electric vehicle having a prime mover including at least a motor, a brake device that is operated by a driver to generate a brake force, and a detector that collects data relating to the brake force. In order to achieve the above-explained objective, according to the exemplary embodiment of the present disclosure, the control system is provided with a controller that is configured to: control the motor to generate a signal torque when the brake device operated to generate the brake force to stop the electric vehicle is returned to reduce the brake force to zero, so as to allow the driver to sense a change in a behavior of the electric vehicle resulting from returning the brake device, and terminate generation of the signal torque by the motor before the brake force is reduced to zero.

In a non-limiting embodiment, the signal torque may include a drive torque generated by the motor possible to generate vibrations sensible by the driver while keeping the electric vehicle to stop.

In a non-limiting embodiment, the electric vehicle may comprises a shifting device that is shifted by the driver between a drive position to select a drive range in which a drive force is established by delivering an output torque of the prime mover to drive wheels, and a non-driving position to select a non-driving range in which the output torque of the prime mover is not delivered to the drive wheels so as not to establish the drive force. The detector may detect a position of the shifting device, and the controller may be further configured to control the motor to generate the signal torque in a same direction as a drive torque to propel the electric vehicle in the forward direction when the shifting device is positioned in the drive position.

In a non-limiting embodiment, the controller may be further configured to control the motor to generate the signal torque in an opposite direction to the drive torque, after generating the signal torque in the same direction as the drive torque by the motor.

In a non-limiting embodiment, the controller may be further configured to control the motor in such a manner that an absolute value of the drive force established by generating the signal torque by the motor will not exceed an absolute value of the brake force.

In a non-limiting embodiment, the controller may be further configured not to generate the signal torque by the motor if a speed to reduce the brake force to zero is faster than a predetermined speed.

Thus, the control system according to the exemplary embodiment of the present disclosure is applied to the electric vehicle is applied to the electric vehicle in which a creep torque is not available, or the electric vehicle having the creeping-cut function. As described, in order to allow the driver to sense a reduction in the brake force when launching the electric vehicle by returning the brake device, the control system is configured to generate the signal torque by the motor when launching the electric vehicle by returning the brake device. To this end, specifically, the control system controls the motor to generate the signal torque in such a manner as to generate sensible vibrations of the vehicle by the signal torque without launching the electric vehicle by the signal torque. In a conventional vehicle having an engine and an automatic transmission, an output torque of the engine is delivered to drive wheels through a torque converter and the transmission. That is, in the conventional vehicle, a creep torque is generated inevitably by the torque converter, and when a brake pedal is returned, the creep torque overwhelms a brake force being reduced. In this situation, a driver recognizes a generation of a drive force by the creep torque when he/she senses vibrations resulting from such exceedance of the creep torque over the brake force. On the other hand, in the electric vehicle in which the creep torque is not generated by the torque converter, such vibrations are not generated even if the brake pedal is returned. According to the exemplary embodiment of the present disclosure, the control system generates vibrations intentionally by controlling the motor to generate the signal torque when the brake pedal is returned. According to the exemplary embodiment of the present disclosure, therefore, the driver is allowed sense the vibrations to grasp a change in the behavior of the electric vehicle when launching the electric vehicle by releasing the brake pedal, as a case of driving conventional vehicles.

Specifically, the motor generates the signal torque (or a drive torque) of a magnitude at which the vibrations sensible by the driver are generated without launching the electric vehicle, when the driver returns the brake pedal. As a result, for example, suspensions are compressed and expanded to change the behavior of the electric vehicle. According to the exemplary embodiment of the present disclosure, therefore, the driver is allowed to grasp the condition and the situation of the electric vehicle based on such change in the behavior of the electric vehicle, when the driver shifts the shifting device to the drive position and returns the brake pedal to launch the electric vehicle. For this reason, the driver is allowed to launch the electric vehicle without feeling any uncomfortable feeling, as the case of launching the conventional vehicle.

More specifically, the motor generates the signal torque in the same direction as the drive torque to propel the electric vehicle, when the driver returns the brake pedal in a drive range or a reverse range. For example, if the shifting device is positioned in the drive position, the motor generates the signal torque in the direction to propel the electric vehicle in the forward direction. By contrast, if the shifting device is positioned in the reverse position, the motor generates the signal torque in the direction to move the electric vehicle in the reverse direction. According to the exemplary embodiment of the present disclosure, therefore, the driver is allowed to confirm the travelling direction when launching the electric vehicle by shifting the shifting device to the drive position while returning the brake pedal. For this reason, the driver is allowed to launch the vehicle by operating the brake pedal while grasping the situation and condition of the vehicle as a case of driving the conventional vehicle.

As described, the control apparatus taught by JP-A-2011-250648 generates the play-reducing torque in a rotational direction of a selected shift position, as the above-explained signal torque according to the exemplary embodiment of the present disclosure. However, the play-reducing torque according to the teachings of JP-A-2011-250648 is generated to reduce shocks and vibrations in a motor transfer system by reducing the play in the motor transfer system. That is, the control apparatus taught by JP-A-2011-250648 generates the play-reducing torque of quite small magnitude to reduce shocks and vibrations. By contrast, the control system according to the exemplary embodiment of the present disclosure generates the signal torque of relatively large magnitude to generate the vibrations intentionally thereby changing the behavior of the electric vehicle without moving the electric vehicle. Thus, the magnitude of the signal torque according to the exemplary embodiment of the present disclosure is different from the magnitude of the play-reducing torque taught by JP-A-2011-250648.

According to the exemplary embodiment of the present disclosure, after generating the signal torque in the travelling direction governed by a position of the shifting device, the motor generates the signal torque in the opposite direction to the travelling direction. According to the exemplary embodiment of the present disclosure, therefore, the electric vehicle is subjected to an alternate load to cause the electric vehicle to vibrate. For this reason, the driver is allowed to sense a change in the behavior of the electric vehicle certainly so as to grasp the situation of the electric vehicle when launching the electric vehicle by returning the brake pedal.

In addition, the control system according to the exemplary embodiment of the present disclosure controls the motor in such a manner that an absolute value of the drive force established by generating the signal torque by the motor will not exceed an absolute value of the brake force. According to the exemplary embodiment of the present disclosure, therefore, the electric vehicle will not be moved unintentionally by the signal torque and the driver is allowed to sense a change in the behavior of the electric vehicle certainly, when returning the brake pedal.

Further, if the speed to return the brake pedal is faster than the predetermined speed, the motor will not generate the signal torque. According to the exemplary embodiment of the present disclosure, therefore, the signal torque will not be generated at a different timing from a timing to return the brake pedal. That is, the signal torque will not be generated at a timing to cause the driver to misunderstand the condition of the electric vehicle, and the electric vehicle will not be launched unintentionally by the signal torque.

BRIEF DESCRIPTION OF THE DRAWINGS

Features, aspects, and advantages of exemplary embodiments of the present disclosure will become better under

DETAILED DESCRIPTION OF THE PREFERRED EMBODIMENT(S)

An exemplary embodiment of the present disclosure will now be explained with reference to the accompanying drawings.

The control system according to the exemplary embodiment of the present disclosure may be applied to an electric vehicle in which a prime mover includes at least one motor, and a hybrid vehicle in which a prime mover includes a motor and an engine. The vehicle to which the control system according to the exemplary embodiment of the present disclosure will be simply called the "vehicle" hereinafter. In the vehicle, an output torque of the motor is delivered to drive wheels to propel the vehicle. A brake force applied to the vehicle is generated by operating a brake device, and an operating range of the vehicle is shifted between a drive range and a non-drive range in accordance with a position of a shifting device. The control system according to the exemplary embodiment of the present disclosure is configured to temporarily generate a signal torque to allow a driver to sense a change in the behavior of the vehicle without moving the vehicle, when releasing the brake pedal being depressed to stop the vehicle.

Figure 1:
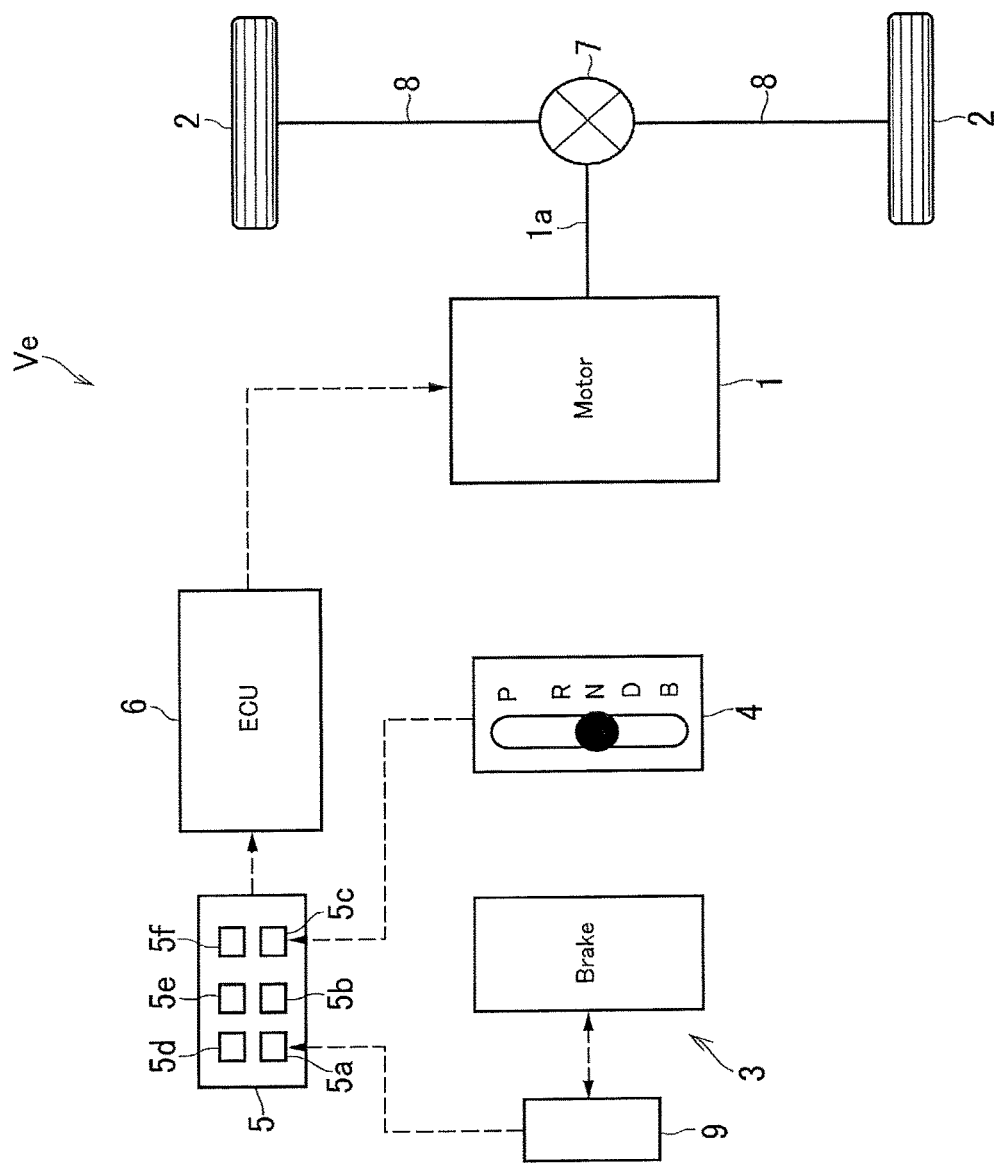
- FIG. 1 is a schematic illustration showing a structure of an electric vehicle to which the control system according to the embodiment of the present disclosure is applied.

Referring now to FIG. 1, there is shown one example of a drive system and a control system of the vehicle Ve to which the control system according to the embodiment of the present disclosure is applied. The vehicle Ve as an electric vehicle comprises: a motor 1 serving as a prime mover; at least one pair of drive wheels 2; a brake device 3; a shifting device 4; a detector 5; and a controller (referred to as "ECU" in the drawings) 6. Here, the prime mover may include a plurality of motors. As described, the control system according to the exemplary embodiment of the present disclosure may also be applied to a hybrid vehicle having an engine, a motor, and a transmission such as a power split mechanism.

For example, a permanent magnet type synchronous motor, and an induction motor may be adopted as the motor 1, and the motor 1 is connected to the drive wheels 2 in a power transmittable manner. The motor 1 serves not only as a motor to generate torque when driven by electricity supplied thereto, but also as a generator to generate electricity when driven by an external torque. That is, the motor 1 is a motor-generator. The motor 1 is connected to a battery through an inverter (neither of which are shown) so that the electricity generated by the motor 1 can be accumulated in the battery. The motor 1 may be operated as a motor to generate torque by supplying the electricity to the motor 1 from the battery. The motor 1 is also connected electrically to the controller 6 so that an output speed and an output torque of the motor 1 are controlled by the controller 6, and the motor 1 is selectively operated as a motor and a generator by the controller 6.

The drive wheels 2 are driven by the output torque of the motor 1 to generate a drive force to propel the vehicle Ve. To this end, in the vehicle Ve shown in FIG. 1, the drive wheels 2 are connected to an output shaft 1a of the motor 1 through a differential gear unit 7 and driveshafts 8. Although one example of a structure of the vehicle Ve is shown, the control system according to the exemplary embodiment of the present disclosure may be applied to a rear wheel drive layout vehicle, a front wheel drive layout vehicle, and an all-wheel drive layout vehicle.

Although not especially shown in FIG. 1, a transmission or a speed reducing mechanism may be interposed between the prime mover and the drive wheels 2. For example, an automatic transmission may be arranged downstream of the motor 1 to multiply the torque delivered to the drive wheels 2. Given that the control system is applied to a hybrid vehicle in which a prime mover includes an engine and a motor, a starting clutch may also be arranged between the engine and drive wheels to serve as a launching device instead of a torque converter. In this case, a friction clutch in which a torque transmitting capacity is changed continuously may be adopted as the starting clutch. By thus using the friction clutch as the starting clutch, the vehicle can be launched smoothly by delivering an output torque of the engine to the drive wheels while gradually changing a torque transmitting capacity of the starting clutch.

For example, a hydraulically actuated disc brake or drum brake may be adopted as the brake device 3. The brake device 3 is actuated to establish a brake force (or brake torque) applied to the vehicle Ve by operating a brake pedal or a brake lever. According to the example shown in FIG. 1, the brake device 3 is actuated to establish a brake force by depressing a brake pedal 9. Specifically, a hydraulic pressure applied to the brake device 3, that is, a brake force generated by the brake device 3 is changed in accordance with a position of the brake pedal 9 or a pedal force applied to the brake pedal 9.

The shifting device 4 comprises a shift lever or a shift paddle (neither of which are shown), and a position the shifting device 4 is shifted between a drive position and a non-drive position. When the shifting device 4 is positioned in the drive position, an output torque of the prime mover is delivered to the drive wheels 2 to propel the vehicle Ve. According to the exemplary embodiment of the present disclosure, the drive position includes the drive position (D position) in which the vehicle Ve is propelled in the forward direction, a reverse position (R position) in which the vehicle Ve is moved backwardly, and a brake position (B position) in which a greater speed ratio is established compared to the drive position. By contrast, when the shifting device 4 is positioned in the non-drive position, the output torque of the prime mover is not delivered to the drive wheels 2, that is, a drive force to propel the vehicle Ve is not generated. According to the exemplary embodiment of the present disclosure, the non-drive position includes a neutral position (N position), and a parking position (P position). Specifically, when the shifting device 4 is positioned in the neutral position, an output torque of the motor 1 is reduced to zero so that the vehicle Ve is not propelled. Given that the vehicle is provided with the automatic transmission, the automatic transmission is brought into a neutral stage when the shifting device 4 is positioned in the neutral position so that a power transmission between the prime mover and the drive wheels 2 is interrupted. Otherwise, the starting clutch is disengaged so that a power transmission between the prime mover and the drive wheels 2 is interrupted. When the shifting device 4 is positioned in the parking position, the vehicle Ve is brought into the above-mentioned conditions in the neutral position, and in addition, the drive wheels 2 are halted by a parking brake or a parking lock mechanism.

The detector 5 includes sensors, devices and so on to collect various data and information relating to the vehicle Ve. For example, the detector 5 collects at least data relating to the brake force which is necessary to control the motor 1 to properly generate the signal torque when relearning the brake pedal 9 being depressed. To this end, the detector 5 comprises: a brake pedal sensor 5a that detects a condition of the brake pedal 9 including a depression of the brake pedal 9, an operating speed of the brake pedal 9, and a pedal force applied to the brake pedal 9; a pressure sensor 5b that detects a hydraulic pressure to actuate the brake device 3; a shift position sensor 5c that detects a shift position of the shifting device 4; a vehicle speed sensor (or a wheel speed sensor) 5d that detects a speed of the vehicle Ve; an acceleration sensor 5e that detects an acceleration of the vehicle Ve; and a motor speed sensor 5f (or a resolver) that detects a speed of the motor 1. The detector 5 is electrically connected to the controller 6 so that the data collected by the detector 5 is transmitted to the controller 6 in the form of electric signal.

The controller 6 comprises a microcomputer as its main constituent, and mainly controls the motor 1. Given that the vehicle Ve is provided with the automatic transmission and the starting clutch, the automatic transmission and the starting clutch are also controlled by the controller 6. The controller 6 performs calculation using the incident data transmitted from the detector 5, and data and formulas or the like stored in advance. Calculation results are transmitted from the controller 6 to e.g., the motor 1. Although only one controller 6 is depicted in the drawings, a plurality of controllers may be arranged in the vehicle Ve to control the specific devices individually.

Thus, the control system according to the exemplary embodiment of the present disclosure is applied to the electric vehicle powered by the motor 1, and the vehicle Ve is not provided with a torque converter. In the vehicle Ve, therefore a creep torque is not generated by the torque converter. As described, the creep torque may also be generated by the motor, and as taught by JP-A-2011-250648, such creep torque generated by the motor may be cut-off so as to reduce electric consumption. If the creep torque is not generated or cut-off, the behavior of the vehicle Ve, e.g., vibrations of the vehicle Ve will not be changed when the brake pedal 9 being depressed to stop the vehicle Ve is released. Therefore, if a driver driving the vehicle in which the creep torque is available on most occasions drives the electric vehicle, the driver may not grasp the situation or condition of the electric vehicle accurately based on a change in the behavior of the vehicle when returning the brake pedal 9 being depressed. In order to allow the driver to grasp the situation or condition of the electric vehicle accurately when returning the brake pedal 9 being depressed, the control system according to the exemplary embodiment of the present disclosure is configured to generate the signal torque for changing the behavior of the vehicle Ve by executing the routine shown in FIG. 2.

Figure 2:
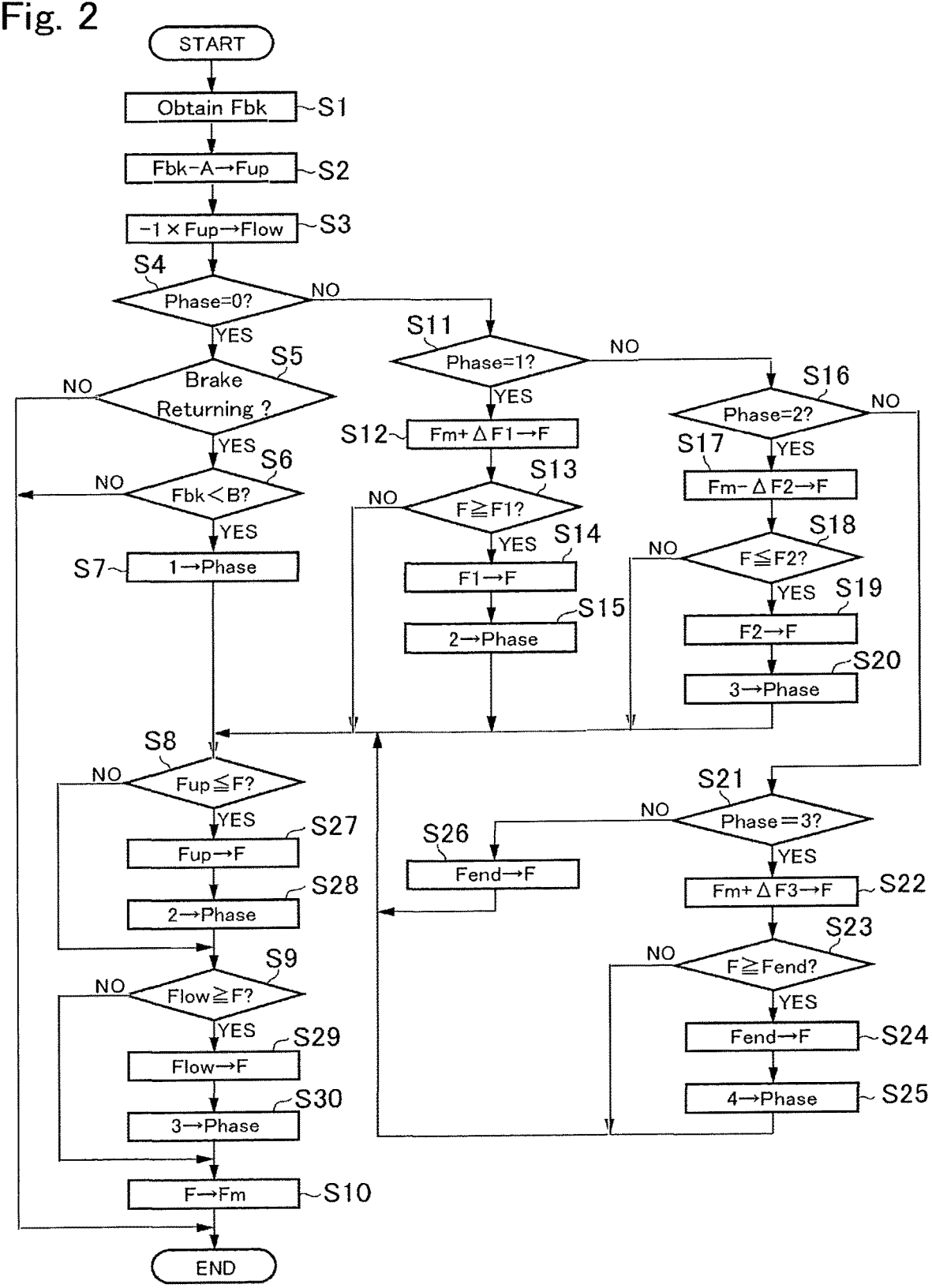
FIG. 2 is a flowchart showing one example of a routine executed by a controller.

The routine shown in FIG. 2 is commenced when the vehicle Ve is stopped by depressing the brake pedal 9. Specifically, the routine shown in FIG. 2 is commenced when the brake pedal 9 is depressed greater than a predetermined value or a pedal force applied to the brake pedal is greater than a predetermined value, and a speed of the vehicle Ve is zero.

At step S1, a brake force Fbk generated by the brake device 3 to stop the vehicle Ve is obtained based on a depression of the brake pedal 9 or a pedal force applied to the brake pedal 9 detected by the brake pedal sensor 5a, and a hydraulic pressure applied to the brake device 3 detected by the pressure sensor 5b. Optionally, the brake force Fbk may be calculated taking account of a road gradient and a running resistance such as a wind velocity around the vehicle Ve and a rolling resistance of the wheel estimated based on a detection value of the acceleration sensor 5e.

At step S2, an upper limit drive force Fup of a drive force F established by generating the signal torque by the motor 1 is calculated. That is, the upper limit drive force Fup is a threshold of the drive force F set to prevent the drive force F from exceeding the brake force Fbk generated by the brake device 3. Specifically, the upper limit drive force Fup is calculated by subtracting a predetermined value A set based on a result of an experimentation or a simulation from an absolute value of the brake force Fbk obtained at step S1. By thus subtracting the predetermined value A from the absolute value of the brake force Fbk to set the upper limit drive force Fup, the drive force F can be increased to the upper limit drive force Fup to generate vibrations to change the behavior of the vehicle Ve without exceeding the brake force Fbk generated by the brake device 3. That is, the output torque of the motor 1 is controlled in such a manner that the drive force F corresponding to the signal torque does not exceed the upper limit drive force Fup.

At step S3, a lower limit drive force Flow of the drive force F is calculated. That is, the lower limit drive force Flow is a threshold of the drive force F set to prevent a brake force established by generating the signal torque by the motor 1 in a counter direction opposite to the drive torque to propel the vehicle Ve from exceeding the brake force Fbk generated by the brake device 3. Specifically, the lower limit drive force Flow is calculated by multiplying the upper limit drive force Fup calculated at step S2 by "−1". By thus setting the lower limit drive force Flow, the brake force established by generating the signal torque by the motor 1 can be changed without exceeding the brake force Fbk generated by operating the brake pedal 9. That is, the output torque of the motor 1 is controlled in such a manner that the drive force F corresponding to the signal torque does not exceed the lower limit drive force Flow.

Figure 3:
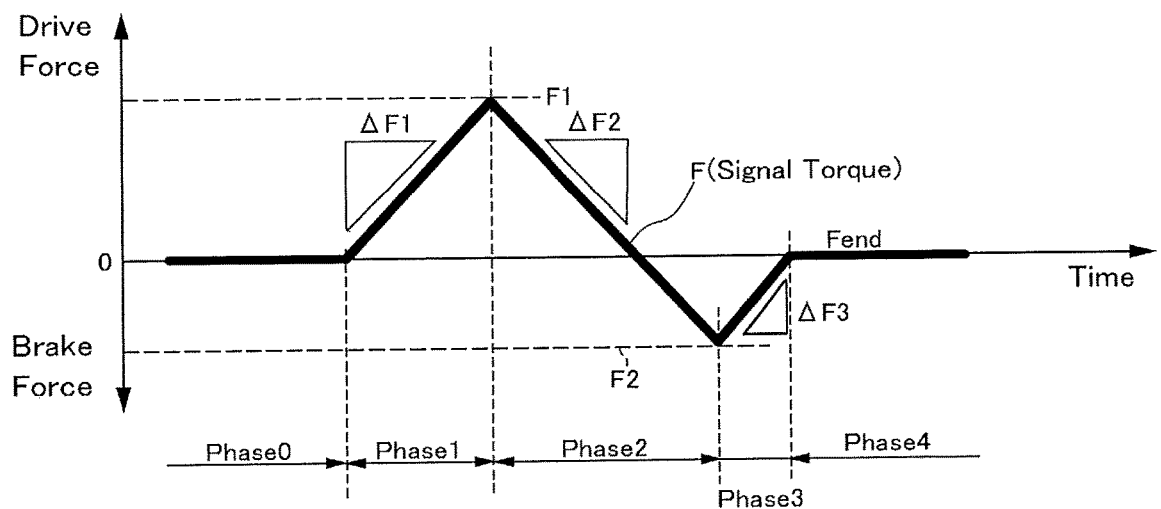
FIG. 3 is a time chart showing a control phase divided into four phases.

At step S4, it is determined whether a current control phase is in the phase 0. According to the exemplary embodiment of the present disclosure, as shown in FIG. 3, the control phase is divided into four phases in accordance with the drive force F established by generating the signal torque by the motor 1. Specifically, the phase 0 corresponds to a period from a commencement of the control of the drive force F to a point at which the drive force F starts changing toward a first target value F1, the phase 1 corresponds to a period from the point at which the drive force F starts changing toward the first target value F1 to a point at which the drive force F reaches the first target value F1, the phase 2 corresponds to a period from the point at which the drive force F reaches the first target value F1 to a point at which the drive force F changing from the first target value F1 reaches a second target value F2, the phase 3 corresponds to a period from the point at which the drive force F reaches the second target value F2 to a point at which the drive force F changing from the second target value F2 reaches a final target value Fend, and the phase 4 corresponds to a period after the point at which the drive force F reaches the final target value Fend.

At the commencement of the control of the drive force F, the control phase is set or reset to the phase 0, and hence the answer of step S4 is YES. In this case, the routine progresses to step S5.

At step S5, it is determined whether the brake pedal 9 depressed to stop the vehicle Ve is being returned. In other words, it is determined whether the brake force Fbk applied to the vehicle Ve is being reduced to zero by returning the brake pedal 9. As described, according to the exemplary embodiment of the present disclosure, the behavior of the vehicle Ve is changed temporarily and intentionally by generating the signal torque by the motor 1 when the brake pedal 9 depressed to stop the vehicle Ve is returned.

If the brake pedal 9 has not yet been returned so that the answer of step S5 is NO, the routine returns without executing any specific control. By contrast, if the brake pedal 9 is being returned so that the answer of step S5 is YES, the routine progresses to step S6 to determine whether the brake force Fbk applied to the vehicle Ve is less than a predetermined value B.

Specifically, the predetermined value B is a threshold value to determine a degree of the brake pedal 9 being returned which is set based on a result of an experimentation or a simulation. Specifically, the motor 1 starts generating the signal torque to change the behavior of the vehicle Ve when the brake force Fbk is reduced less than the predetermined value B.

If the brake force Fbk is still greater than the predetermined value B so that the answer of step S6 is NO, the routine returns without carrying out the subsequent controls. By contrast, if the brake force Fbk has been reduced less than the predetermined value B so that the answer of step S6 is YES, the routine progresses to step S7 to shift the control phase to the phase 1.

Consequently, the drive force F is changed toward the first target value F1. Specifically, according to the example shown in FIG. 4, the drive force F is increased in the phase 1 toward the first target value F1.

Then, at step S8, it is determined whether the drive force F reaches the upper limit drive force Fup. In the case that the control phase is thus shifted to the phase 1, the drive force F has not yet been increased in the current routine. In this case, therefore, the drive force F has not yet reached the upper limit drive force Fup and the answer of step S8 is NO. Consequently, the routine progresses to step S9.

At step S9, it is determined whether the drive force F reaches the lower limit drive force Flow. Specifically, it is determined whether the drive force F has been reduced to the lower limit drive force Flow or reduced less than the lower limit drive force Flow in the phase 2. In this situation, however, the control phase has not yet been shifted from the phase 1 to the phase 2. Therefore, the drive force F has not yet been reduced in this situation, and the answer of step S9 is NO. Consequently, the routine progresses to step S10 to store the current drive force F as a drive force Fm.

For example, the drive force Fm may be stored in a RAM (i.e., a Random Access Memory) of the controller 6. After thus storing the current drive force F at step S10, the routine returns. That is, the current routine is terminated.

Then, in the next routine, steps S1 to S3 are repeated as explained above, and since the control phase has been shifted to the phase 1 in the previous routine, the answer of step S4 in the current routine is NO. In this situation, therefore, the routine progresses to step S11 to determine whether the current control phase is in the phase 1.

As described, the control phase has been shifted to the phase 1 in this situation, therefore, the answer of step S11 is NO, and the routine progresses to step S12 to start generating the signal torque by the motor 1.

Thus, as a result that the control phase has been shifted from the phase 0 to the phase 1, the motor 1 is operated to generate the drive torque as the signal torque. In this situation, if the shifting device 4 is in the drive position such as the D position or the B position, the motor 1 generates the signal torque in the same direction as the drive torque for propelling the vehicle Ve in the forward direction. By contrast, if the shifting device 4 is in the R position, the motor 1 generates the signal torque in the same direction as the drive torque for propelling the vehicle Ve in the reverse direction. By thus operating the motor 1 to generate the signal torque, the drive force F is established by the signal torque.

Specifically, the drive force F is increased to a value calculated by adding a drive force ΔF1 to the drive force Fm stored in the previous routine. That is, the drive force ΔF1 is a change amount to increase the drive force F in the phase 1 (i.e., a change amount of the drive force F per routine). In other words, as indicated in FIG. 3, the drive force F established by the signal torque of the motor 1 is increased in the phase 1 at a change rate of the drive force ΔF1.

Then, at step S13, it is determined whether the drive force F thus increased at step S12 reaches the first target value F1, or increased greater than the first target value F1.

If the drive force F has not yet been increased to the first target value F1 so that the answer of step S13 is NO, the routine progresses to step S13 to determine whether the drive force F established at step S12 reaches the upper limit drive force Fup or increased greater than the upper limit drive force Fup.

Figure 4:
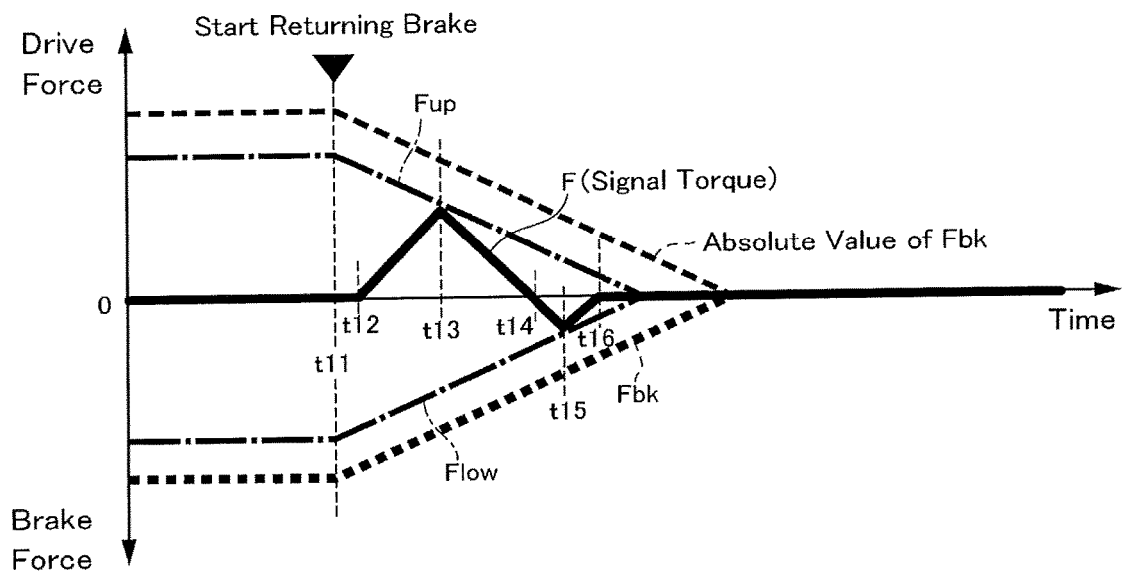
FIG. 4 is a time chart showing one example of a temporal change in the signal torque during execution of the routine shown in FIG. 2.

As indicated in FIG. 4, after the driver starts returning the brake pedal 9 at point t11, the motor 1 starts generating the signal torque thereby increasing the drive force F. As indicated in FIG. 3, the drive force F is increased toward the first target value F1. In order not to increase an absolute value of the drive force F established by generating the signal torque by the motor 1 greater than the absolute value of the brake force Fbk generated by operating the brake pedal 9, the first target value F1 is set to a value smaller than the absolute value of the brake force Fbk.

If the drive force F is still smaller than the upper limit drive force Fup so that the answer of step S8 is NO, the routine progresses to step S9 to determine whether the drive force F reaches the lower limit drive force Flow.

At step S9, specifically, it is determined whether the drive force F has been reduced to the lower limit drive force Flow or reduced less than the lower limit drive force Flow in the phase 2. In this situation, however, the control phase has not yet been shifted from the phase 1 to the phase 2. Therefore, the drive force F has not yet been reduced in this situation, and the answer of step S9 is NO. Consequently, the routine progresses to step S10 to store the current drive force F as the drive force Fm.

After thus storing the current drive force F at step S10, the routine returns. That is, the current routine is terminated.

By contrast, if the drive force F is increased to the first target value F1 or increased greater than the first target value F1 in the subsequent routine so that the answer of step S13 is YES, the routine progresses to step S14 to temporarily fix the drive force F to the first target value F1.

As a result of increasing the drive force F to the first target value F1, the increasing operation of the drive force F is terminated.

Then, at step S15, the control phase is shifted to the phase 2. As described, in the phase 2, the drive force F is changed toward the second target value F2. Specifically, according to the example shown in FIG. 4, the drive force F is reduced in the phase 2 toward the second target value F2.

Thereafter, at step S8, it is determined whether the drive force F reaches the upper limit drive force Fup. In the current routine, the drive force F has been increased to the first target value F1 and hence the control phase is thus shifted to the phase 2. Consequently, the increasing operation of the drive force F is terminated. In this situation, therefore, the drive force F will not reach the upper limit drive force Fup and the answer of step S8 is NO. For this reason, the routine progresses to step S9.

At step S9, it is determined whether the drive force F reaches the lower limit drive force Flow. Specifically, it is determined whether the drive force F has been reduced to the lower limit drive force Flow or reduced less than the lower limit drive force Flow in the phase 2. In this situation, although the control phase has been shifted from the phase 1 to the phase 2, the drive force F has not yet been changed toward the second target value F2 and the lower limit drive force Flow. Therefore, the drive force F has not yet been reduced to the lower limit drive force Flow, and the answer of step S9 is NO. Consequently, the routine progresses to step S10 to store the current drive force F as the drive force Fm.

After thus storing the current drive force F at step S10, the routine returns. That is, the current routine is terminated.

Then, in the next routine, steps S1 to S3 are repeated as explained above. In this situation, since the control phase has been shifted to the phase 2 in the previous routine, the answer of step S4 in the current routine is NO, and the answer of step S11 in the current routine is also NO. In this situation, therefore, the routine progresses to step S16 to determine whether the current control phase is in the phase 2.

As described, the control phase has been shifted from the phase 1 to the phase 2 in this situation. Therefore, the answer of step S16 is YES, and the routine progresses to step S17 to start changing the drive force F toward the second target value F2.

According to the example shown in FIG. 3, in the phase 2, the drive force F is changed from the first target value F1 set to a value in a range where the drive is established (i.e., to a value above zero in FIG. 3) toward the second target value F2 set to a value in a range where the brake force is established (i.e., to a value below zero in FIG. 3). In the phase 2, specifically, the drive force F is reduced from the first target value F1 to zero, and increased from 0 to the second target value F2 to increase the brake force. In order not to increase the drive force F as the brake force established by generating the signal torque by the motor 1 in the counter direction greater than the absolute value of the brake force Fbk generated by operating the brake pedal 9, the second target value F2 is set to a value smaller than the brake force Fbk.

Specifically, the drive force F is reduced to a value calculated by adding a drive force ΔF2 to the drive force Fm stored in the previous routine. That is, the drive force ΔF2 is a change amount to reduce the drive force F in the phase 2 (i.e., a change amount of the drive force F per routine). Specifically, the drive force ΔF2 is set to a value possible to terminate the generation of the signal torque by the motor 1 before the brake force Fbk is reduced to zero by returning the brake pedal 9. Accordingly, as indicated in FIG. 3, the drive force F established by the signal torque of the motor 1 is reduced in the phase 2 at a change rate of the drive force ΔF2.

Then, at step S18, it is determined whether the drive force F thus reduced at step S17 reaches the second target value F2, or reduced less than the second target value F2. In other words, as indicated in FIG. 4, it is determined whether the drive force F is reduced to zero, and then increased greater than the second target value F2 to establish the brake force.

If the drive force F has not yet reached the second target value F2 so that the answer of step S18 is NO, the routine progresses to step S8 to repeat steps S8, S9, and S10 in sequence.

By contrast, if the drive force F is increased to the second target value F2 or increased greater than the second target value F2 in the subsequent routine so that the answer of step S18 is YES, the routine progresses to step S19 to temporarily fix the drive force F to the second target value F2.

As a result of changing the drive force F to the second target value F2, the reducing operation of the drive force F is terminated.

Then, at step S20, the control phase is shifted to the phase 3. As described, in the phase 3, the drive force F is changed toward the final target value Fend. Specifically, according to the example shown in FIG. 4, the drive force F is increased in the phase 3 toward the final target value Fend.

Thereafter, at step S8, it is determined whether the drive force F reaches the upper limit drive force Fup. In the current routine, the drive force F has been changed to the second target value F2 and hence the control phase is thus shifted to the phase 3. Consequently, the reducing operation of the drive force F is terminated. In this situation, therefore, the drive force F has not yet reached the upper limit drive force Fup and the answer of step S8 is NO. For this reason, the routine progresses to step S9.

At step S9, it is determined whether the drive force F reaches the lower limit drive force Flow. As described, such determination at step S9 is made to determine whether the drive force F has been reduced to the lower limit drive force Flow or reduced less than the lower limit drive force Flow in the phase 2. In this situation, since the control phase has been shifted from the phase 2 to the phase 3, the drive force F will not be changed toward the second target value F2 and the lower limit drive force Flow. Therefore, the answer of step S9 is NO, and the routine progresses to step S10 to store the current drive force F as the drive force Fm.

After thus storing the current drive force F at step S10, the routine returns. That is, the current routine is terminated.

Then, in the next routine, steps S1 to S3 are repeated as explained above. In this situation, since the control phase has been shifted to the phase 3 in the previous routine, the answer of step S4 is NO, the answer of step S11 is NO, and the answer of step S16 is NO. In this situation, therefore, the routine progresses to step S21 to determine whether the current control phase is in the phase 3.

As described, the control phase has been shifted from the phase 2 to the phase 3 in this situation. Therefore, the answer of step S21 is YES, and the routine progresses to step S22 to start changing the drive force F toward the final target value Fend.

According to the example shown in FIG. 3, in the phase 3, the drive force F is changed from the second target value F2 set to the value in the range where the brake force is established toward the final target value Fend set to zero or set around zero. In other words, in the phase 3, the drive force F is changed from the second target value F2 toward the final target value Fend to reduce the brake force.

Specifically, the drive force F is increased to a value calculated by adding a drive force ΔF3 to the drive force Fm stored in the previous routine. That is, the drive force ΔF3 is a change amount to increase the drive force F in the phase 3 (i.e., a change amount of the drive force F per routine). Specifically, the drive force ΔF3 is set to a value possible to terminate the generation of the signal torque by the motor 1 before the brake force Fbk is reduced to zero by returning the brake pedal 9. Accordingly, as indicated in FIG. 3, the drive force F established by the signal torque of the motor 1 is increased in the phase 3 at a change rate of the drive force ΔF3. In other words, the brake force established by the signal torque of the motor 1 is reduced in the phase 3 at the change rate of the drive force ΔF3.

Then, at step S23, it is determined whether the drive force F thus increased at step S22 reaches the final target value Fend, or increased greater than the final target value Fend. In other words, as indicated in FIG. 4, it is determined whether the drive force F as the brake force is reduced less than the final target value Fend.

If the drive force F is still less than the final target value Fend so that the answer of step S23 is NO, the routine progresses to step S8 to repeat steps S8, S9, and S10 in sequence.

By contrast, if the drive force F is increased to the final target value Fend or increased greater than the final target value Fend in the subsequent routine so that the answer of step S23 is YES, the routine progresses to step S24 to fix the drive force F to the final target value Fend.

As a result of increasing the drive force F to the final target value Fend, the increasing operation of the drive force F is terminated.

Then, at step S25, the control phase is shifted to the phase 4. In the phase 4, the drive force F is maintained to the final target value Fend. As described, the final target value Fend is set to zero or set around zero. In the phase 4, generation of the signal torque by the motor 1 has already been terminated, and the brake force applied to the vehicle Ve is eliminated by returning the brake pedal 9. However, in a case that the vehicle Ve stops at a slope, for example, the drive force is required to keep the vehicle Ve stopping. In this case, the final target value Fend may also be set to a value possible to keep the vehicle Ve stopping on the slope, instead of zero.

Thereafter, at step S8, it is determined whether the drive force F reaches the upper limit drive force Fup. Specifically, at step S8, it is determined whether the drive force F is increased greater than the upper limit drive force Fup. In the current routine, the drive force F has been fixed to the final target value Fend, and hence the control phase has already been shifted to the phase 4. In this situation, therefore, the drive force F will not be increased to the upper limit drive force Fup, and the answer of step S8 is NO. For this reason, the routine progresses to step S9.

At step S9, it is determined whether the drive force F reaches the lower limit drive force Flow. Specifically, at step S9, it is determined whether the drive force F is reduced less than the lower limit drive force Flow. As described, in the current routine, the drive force F has been fixed to the final target value Fend, and hence the control phase has already been shifted to the phase 4. That is, the drive force F has been increased greater than the lower limit drive force Flow. In this situation, therefore, Therefore, the answer of step S9 is NO, and the routine progresses to step S10 to store the current drive force F as the drive force Fm.

After thus storing the current drive force F at step S10, the routine returns. That is, the current routine is terminated.

Then, in the next routine, steps S1 to S3 are repeated as explained above. In this situation, since the control phase has been shifted to the phase 4 in the previous routine, the answer of step S4 is NO, the answer of step S11 is NO, the answer of step S16 is NO, and the answer of step S21 is NO. In this situation, therefore, the routine progresses to step S26 to fix the drive force F to the final target value Fend.

As a result of increasing the drive force F to the final target value Fend, the increasing operation of the drive force F is terminated.

Thereafter, the routine progresses to step S8 to repeat steps S8, S9, and S10 in sequence. In this situation, the control phase is maintained to the phase 4.

By thus executing the control to generate the signal torque, the drive force F is established by the signal torque generated by the motor 1. In the initial phase, the drive force F is generated by generating the signal torque by the motor 1 in the same direction as the drive torque to propel the vehicle Ve in the forward direction. Specifically, as indicated in FIG. 4, the drive force F is increased from point t12 to point t13 in the direction to increase the drive force without exceeding the brake force Fbk being reduced by returning the brake pedal 9. Consequently, the acceleration of the vehicle Ve is established by such increase in the drive force F to the extent not to move the vehicle Ve so that the behavior of the vehicle Ve is changed. For example, the acceleration of a small magnitude but possible to be detected by the acceleration sensor 5e is established. Therefore, the driver is allowed to sense such change in the behavior of the vehicle Ve, e.g., change in vibrations of the vehicle Ve resulting from increasing the drive force F when returning the brake pedal 9.

For example, when the shifting device 4 is in the D position, the motor 1 generates the signal torque in the direction to propel the vehicle Ve in the forward direction. By contrast, when the shifting device 4 is in the R position, the motor 1 generates the signal torque in the direction to move the vehicle Ve in the reverse direction. According to the exemplary embodiment of the present disclosure, therefore, the driver is allowed to confirm the travelling direction when launching the vehicle Ve by shifting the shifting device 4 to the drive position while returning the brake pedal 9. For this reason, the driver is allowed to launch the vehicle Ve by operating the brake pedal 9 while grasping the situation and condition of the vehicle Ve as a case of driving conventional vehicles.

Thus, according to the exemplary embodiment of the present disclosure, the motor 1 generates the signal torque to allow the driver to sense a change in the behavior of the vehicle Ve when returning the brake pedal 9. To this end, after increasing the drive force F to a magnitude at which the behavior of the vehicle Ve is changed to a sensible level, the drive force F is reduced by generating the signal torque by the motor 1 in the opposite direction to the direction of the torque to propel the vehicle Ve in the forward direction. Specifically, according to the example shown in FIG. 4, the drive force F is reduced toward zero from point t13 to t14, and further reduced in the direction to increase the brake force from point t14 to point t15. That is, the motor 1 generates the signal torque in the opposite direction to the direction of the torque to propel the vehicle Ve in the forward direction, from point t14 to point t15. In this situation, the brake force established by the signal torque of the motor 1 is increased without exceeding the brake force Fbk being reduced by returning the brake pedal 9.

Then, the brake force established by the signal torque of the motor 1 is reduced with the reduction in the brake force Fbk. According to the example shown in FIG. 4, the brake force established by the signal torque of the motor 1 is reduced toward zero from point t15 to point t16. In other words, the drive force F established by generating the signal torque by the motor 1 in the same direction as the torque to propel the vehicle Ve in the forward direction is increased toward zero from point t15 to point t16. In this situation, the drive force F is increased at the change rate of the drive force ΔF3. Consequently, the drive force F is converged to zero at point t16 before the brake force Fbk is reduced to zero. When the drive force F becomes zero at point t16, generation of the signal torque by the motor 1 is terminated.

Thus, when launching the vehicle Ve by shifting the shifting device 4 to the drive position while returning the brake pedal 9, the motor 1 generates the signal torque in the same direction as the drive torque to propel the vehicle Ve in the forward direction, and then generates the signal torque in the opposite direction. That is, the vehicle Ve is subjected to the drive force F serving as an alternate load to cause the vehicle Ve to vibrate. Therefore, the driver is allowed to sense a change in the behavior of the vehicle Ve easily, so as to grasp the situation of the vehicle Ve when launching the vehicle Ve by returning the brake pedal 9.

Figure 5:
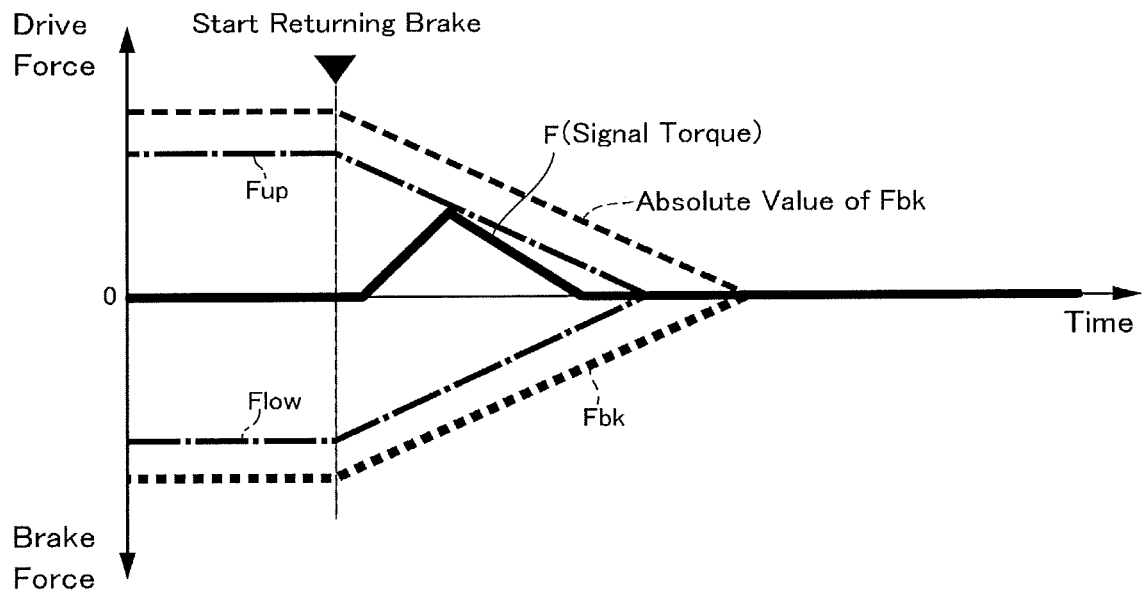
FIG. 5 is a time chart showing an example of a temporal change in the signal torque in which the signal torque is generated only in the travelling direction.

Instead, as indicated in FIG. 5, the signal torque may be generated only in the direction to propel the vehicle Ve in the forward direction to increase the drive force F. To this end, the second target value F2 is set to zero during execution of the routine shown in FIG. 2. In this case, the driver may also sense a change in the change in the behavior of the vehicle Ve when launching the vehicle Ve by returning the brake pedal 9. In addition, the control contents may be simplified to reduce a control load on the controller 6.

Figure 6:
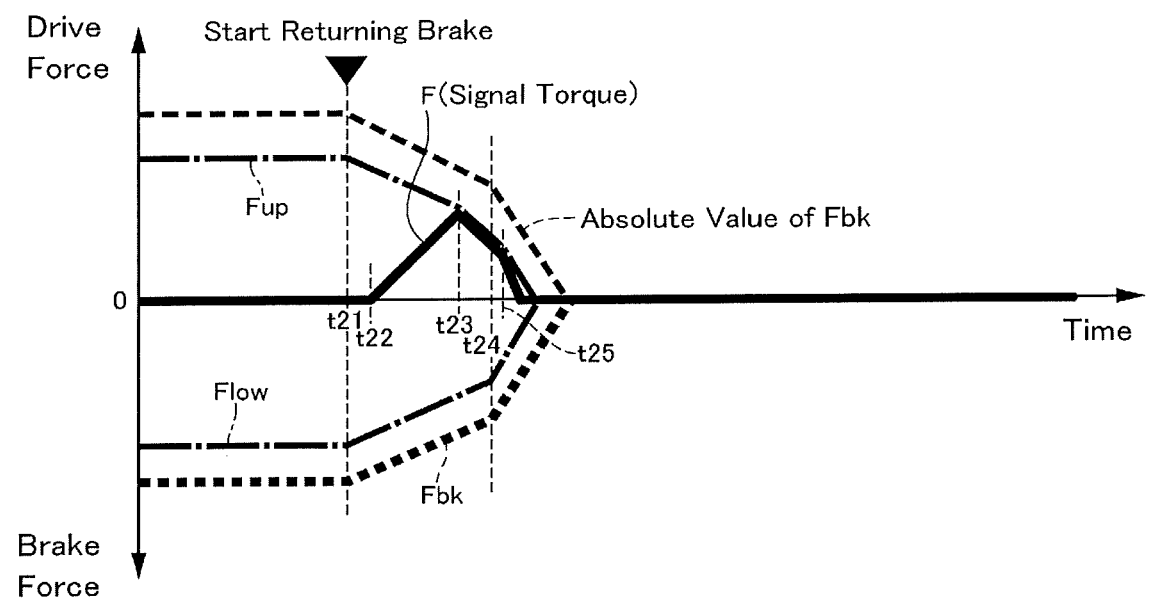
FIG. 6 is a time chart showing an example of a temporal change in the signal torque in which a speed to return the brake torque is increased while the brake pedal is returned.

In the foregoing example, the brake pedal 9 is returned by the driver at a constant speed, and the drive force F is changed based on the first target value F1 and the second target value F2. However, a speed to return the brake pedal 9 may be changed when returning the brake pedal 9. For example, as indicated in FIG. 6, the speed to return the brake pedal 9 may be increased while the brake pedal 9 is returned. In this case, the routine shown in FIG. 2 is executed in the following manner.

For example, in a case that the drive force F increased at step S12 has not yet been increased to the first target value F1 in the phase 1 so that the answer of step S13 is NO, the routine progresses to step S8 as explained above.

Then, at step S8, it is determined whether the drive force F reaches the upper limit drive force Fup. Specifically, at step S8, it is determined whether the drive force F is increased greater than the upper limit drive force Fup. If the speed to return the brake pedal 9 is increased while the brake pedal 9 is returned, the drive force F being increased toward the first target value F1 may reach the upper limit drive force Fup before reaching the first target value F1. If the drive force F reaches the upper limit drive force Fup in this situation so that the answer of step S8 is YES, the routine progresses to step S27 to temporarily fix the drive force F to the upper limit drive force Fup.

As a result of increasing the drive force F to the upper limit drive force Fup, the increasing operation of the drive force F is terminated.

Then, at step S28, the control phase is shifted to the phase 2, and the drive force F will be reduced toward the second target value F2 and the lower limit drive force Flow in the subsequent routine. Thereafter, the routine progresses to step S9 to repeat steps S9 and S10 in sequence.

As another example, in a case that the drive force F reduced at step S17 has not yet reached the second target value F2 in the phase 2 so that the answer of step S18 is NO, the routine progresses to step S8.

In this case, since the control phase is in the phase 2, the answer of step S8 is NO, and the routine progresses to step S9 to determine whether the drive force F reaches the lower limit drive force Flow.

Specifically, at step S9, it is determined whether the drive force F is reduced less than the lower limit drive force Flow. If the speed to return the brake pedal 9 is increased while the brake pedal 9 is returned as indicated in FIG. 6, the drive force F being reduced toward the second target value F2 may reach the lower limit drive force Flow before reaching the second target value F2. If the drive force F reaches the lower limit drive force Flow in this situation so that the answer of step S9 is YES, the routine progresses to step S29 to temporarily fix the drive force F to the lower limit drive force Flow.

As a result of reducing the drive force F to the lower limit drive force Flow, the reducing operation of the drive force F is temporarily terminated.

Then, at step S30, the control phase is shifted to the phase 3, and the drive force F will be reduced toward the second target value F2 and the lower limit drive force Flow in the subsequent routine. Thereafter, the routine progresses to step S10 to repeat step S10.

As indicated in FIG. 6, after the driver starts returning the brake pedal 9 at point t21, the motor 1 starts generating the signal torque so that the drive force F is increased from point t22. When the drive force F is increased to the upper limit drive force Fup at point t23, the control phase is shifted to the phase 2 to start reducing the drive force F toward zero. In this situation, when the returning speed of the brake pedal 9 is increased at point t24, a change rate of the brake force Fbk being reduced and a change rate of the upper limit drive force Fup are increased. Consequently, the drive force F reaches the upper limit drive force Fup again at point t25. In this situation, the target value of the drive force F is updated so that the drive force F is reduced toward zero without exceeding an absolute value of the brake force Fbk. Therefore, even if the returning speed of the brake pedal 9 is increased while the brake pedal 9 is returned, it is possible to change the behavior of the vehicle Ve by the drive force F while stopping the vehicle Ve.

Figure 7:
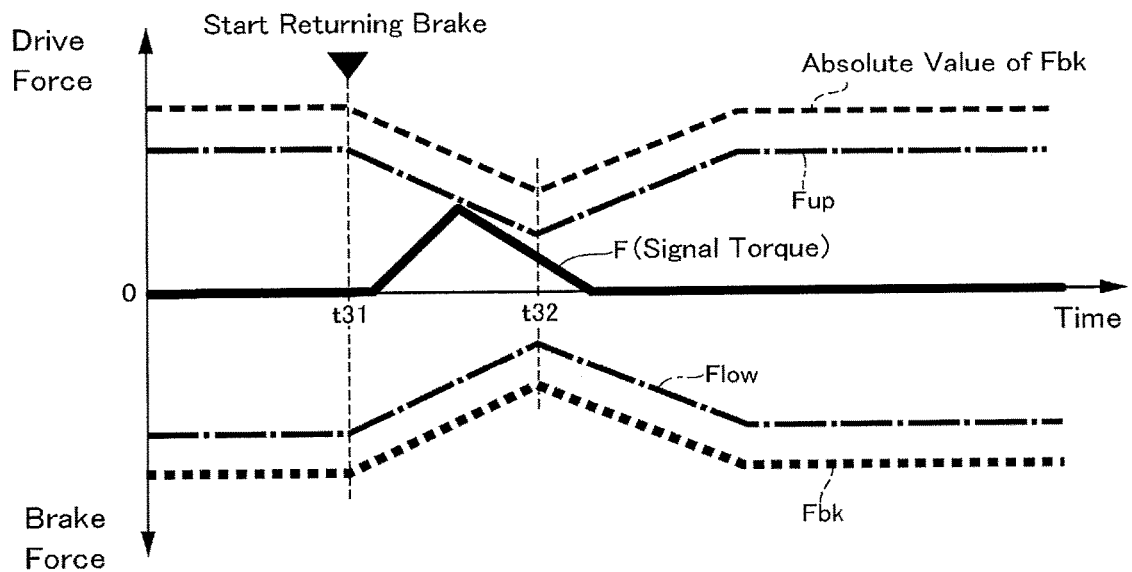
FIG. 7 is a time chart showing an example of a temporal change in the signal torque in which the brake pedal being returned is depressed again.

FIG. 7 shows an example in which the brake pedal 9 being returned is depressed before fully returned. According to the example shown in FIG. 7, after the driver starts returning the brake pedal 9 at point t31, the brake pedal 9 is depressed at point t32 before the brake pedal 9 is fully returned, that is, before the brake force Fbk is reduced to zero. In this situation, the motor 1 generates the signal torque to increase the drive force F as long as the brake pedal 9 is returned, but the drive force F will not be changed intentionally even if the brake pedal 9 is depressed again. That is, the driver has already sensed the vibration of the vehicle Ve caused by increasing the drive force F when starting to return the brake pedal 9. In this case, since the brake pedal 9 is depressed again, it may be estimated that the driver does not intend to launch the vehicle Ve. Therefore, it is no longer necessary to generate the signal torque by the motor 1 to change the behavior of the vehicle Ve.

Figure 8:
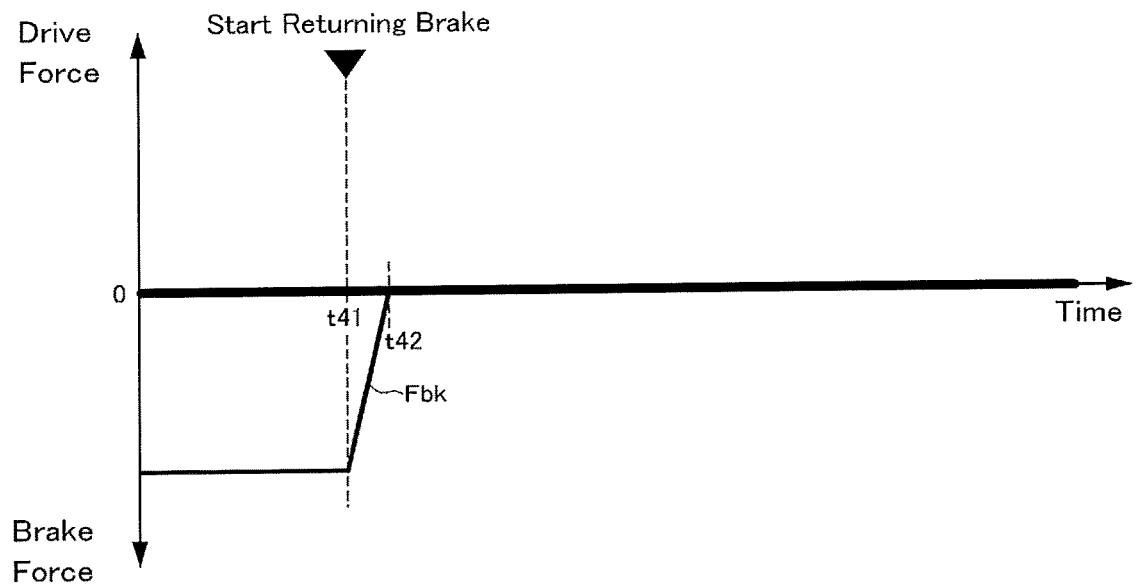
FIG. 8 is a time chart showing an example of a temporal change in the signal torque in which a speed to return the brake pedal is faster than the predetermined speed.

FIG. 8 shows an example in which a speed to return the brake pedal 9 is too fast and hence the drive force F cannot be increased by generating the signal torque by the motor 1 in accordance with a reduction in depression of the brake pedal 9. According to the example shown in FIG. 8, the driver starts returning the brake pedal 9 at point t41, and the brake pedal 9 is fully returned to the initial position at point t42 immediately after starting to return the brake pedal 9. In other words, the brake force Fbk is reduced to zero immediately after starting to return the brake pedal 9. That is, the speed to return the brake pedal 9 from point t41 to point t42 is faster than a predetermined speed. Specifically, the predetermined speed is a threshold speed to determine whether the speed to return the brake pedal 9 to the initial position is too fast to increase the drive force F by generating the signal torque by the motor 1. According to the example shown in FIG. 8, the speed to return the brake pedal 9 to the initial position to reduce the brake force Fbk to zero is faster than the predetermined speed, therefore, the drive force F is not increased by generating the signal torque by the motor 1. In this case, the drive force F will not be increased at a different timing from a timing to return the brake pedal 9. That is, the drive force F will not be increased at a timing to cause the driver to misunderstand the condition of the vehicle Ve, and the vehicle Ve will not be launched unintentionally by the drive force F.

Thus, the control system according to the exemplary embodiment of the present disclosure is applied to the electric vehicle in which the creep torque is not generated by the torque converter, or the electric vehicle having the creeping-cut function. As has been explained hereinbefore, in order to allow the driver to sense a reduction in the brake force Fbk when launching the vehicle Ve by returning the brake pedal 9, the control system is configured to generate the signal torque when launching the vehicle Ve by returning the brake pedal 9. To this end, specifically, the control system controls the motor 1 to generate the signal torque in such a manner as to generate sensible vibrations of the vehicle Ve by the signal torque without launching the vehicle by the signal torque. According to the exemplary embodiment of the present disclosure, therefore, the driver is allowed to grasp the situation or condition of the vehicle Ve when launching the vehicle Ve by releasing the brake pedal 9 as a case of driving conventional vehicles.

Although the above exemplary embodiments of the present disclosure have been described, it will be understood by those skilled in the art that the present disclosure should not be limited to the described exemplary embodiments, and various changes and modifications can be made within the scope of the present disclosure.

What is claimed is:

1. A control system for an electric vehicle having a prime mover including at least a motor, a brake device that is operated by a driver to generate a brake force, and a detector that collects data relating to the brake force, comprising:
a controller that is configured to
control the motor to generate a signal torque when the brake device operated to generate the brake force to stop the electric vehicle is returned to reduce the brake force to zero, so as to allow the driver to sense a change in a behavior of the electric vehicle resulting from returning the brake device, and
terminate generation of the signal torque by the motor before the brake force is reduced to zero.

2. The control system for the electric vehicle as claimed in claim 1, wherein the signal torque includes a drive torque generated by the motor possible to generate vibrations sensible by the driver while keeping the electric vehicle to stop.

3. The control system for the electric vehicle as claimed in claim 1,
wherein the electric vehicle comprises a shifting device that is shifted by the driver between a drive position to select a drive range in which a drive force is established by delivering an output torque of the prime mover to drive wheels, and a non-driving position to select a non-driving range in which the output torque of the prime mover is not delivered to the drive wheels so as not to establish the drive force,
the detector detects a position of the shifting device, and
the controller is further configured to control the motor to generate the signal torque in a same direction as a drive torque to propel the electric vehicle in the forward direction when the shifting device is positioned in the drive position.

4. The control system for the electric vehicle as claimed in claim 3, wherein the controller is further configured to control the motor to generate the signal torque in an opposite direction to the drive torque, after generating the signal torque in the same direction as the drive torque by the motor.

5. The control system for the electric vehicle as claimed in claim 1, wherein the controller is further configured to control the motor in such a manner that an absolute value of the drive force established by generating the signal torque by the motor will not exceed an absolute value of the brake force.

6. The control system for the electric vehicle as claimed in claim 1, wherein the controller is further configured not to generate the signal torque by the motor if a speed to reduce the brake force to zero is faster than a predetermined speed.

* * * * *